(12) United States Patent
Umebayashi

(10) Patent No.: US 12,458,542 B2
(45) Date of Patent: Nov. 4, 2025

(54) APPARATUS AND METHOD FOR MANUFACTURING ABSORBENT BODY

(71) Applicant: ZUIKO CORPORATION, Osaka (JP)

(72) Inventor: Toyoshi Umebayashi, Osaka (JP)

(73) Assignee: ZUIKO CORPORATION, Osaka (JP)

( * ) Notice: Subject to any disclaimer, the term of this patent is extended or adjusted under 35 U.S.C. 154(b) by 242 days.

(21) Appl. No.: 17/638,120

(22) PCT Filed: Aug. 21, 2020

(86) PCT No.: PCT/JP2020/031617
§ 371 (c)(1),
(2) Date: Feb. 24, 2022

(87) PCT Pub. No.: WO2021/049275
PCT Pub. Date: Mar. 18, 2021

(65) Prior Publication Data
US 2022/0287886 A1    Sep. 15, 2022

(30) Foreign Application Priority Data

Sep. 11, 2019  (JP) .................. 2019-165226
Dec. 18, 2019  (JP) .................. 2019-228225

(51) Int. Cl.
A61F 13/15    (2006.01)
B32B 38/18    (2006.01)
B65H 20/12    (2006.01)

(52) U.S. Cl.
CPC .. *A61F 13/15658* (2013.01); *A61F 13/15634* (2013.01); *A61F 13/1565* (2013.01);
(Continued)

(58) Field of Classification Search
CPC ............ A61F 13/15634; A61F 13/1565; A61F 13/15658; B65H 20/12;
(Continued)

(56) References Cited

U.S. PATENT DOCUMENTS 4,995,141 A    2/1991  Gould
6,923,926 B2 *  8/2005  Walter .............. A61F 13/15658
                                                156/200

(Continued)

FOREIGN PATENT DOCUMENTS

CN   103948471 A    7/2014
JP     3462232 B    11/2003
(Continued)

OTHER PUBLICATIONS

International Search Report for corresponding Application No. PCT/JP2020/031617, mailed Nov. 2, 2020.

*Primary Examiner* — Carson Gross
(74) *Attorney, Agent, or Firm* — Renner, Otto, Boiselle & Sklar, LLP

(57) ABSTRACT

A manufacturing apparatus of an absorbent body includes: a duct to convey fibrillated fibers via an air flow; a first drum to allow the fibers conveyed through the duct to be accumulated on an outer peripheral face by the suction force from the interior to convey a fiber body of the accumulated fibers, the first drum being a first pattern drum to define the shape of the fiber body; a spraying device to spray absorbent particles; a second drum to convey an aggregate obtained by collecting the sprayed particles on an outer peripheral face by the suction force from the interior, the second drum being a second pattern drum to control the distribution of the aggregate; and a layering unit to layer the fiber body and the aggregate to each other.

9 Claims, 12 Drawing Sheets

(52) U.S. Cl.
CPC .......... *B32B 38/1858* (2013.01); *B65H 20/12* (2013.01); *B65H 2301/44336* (2013.01)

(58) Field of Classification Search
CPC .. B65H 2301/44336; B65H 2404/1362; B65H 2404/1363; B32B 38/1858
See application file for complete search history.

(56) References Cited

U.S. PATENT DOCUMENTS

| | | | |
|---|---|---|---|
| 2014/0305570 A1* | 10/2014 | Matsunaga | ............ D04H 1/732 156/62.2 |
| 2015/0223999 A1 | 8/2015 | Goda | |
| 2017/0128276 A1 | 5/2017 | Scaife | |

FOREIGN PATENT DOCUMENTS

| | | | | |
|---|---|---|---|---|
| JP | 2014-090749 A | 5/2014 | | |
| JP | 2017-518861 A | 7/2017 | | |
| WO | WO-2007111989 A2 * | 10/2007 | ....... | A61F 13/15203 |

* cited by examiner

FIG. 6
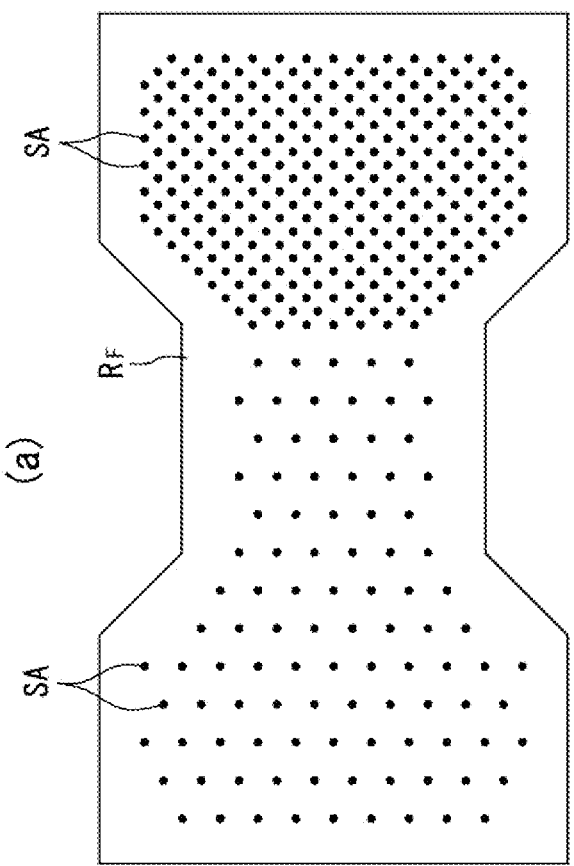
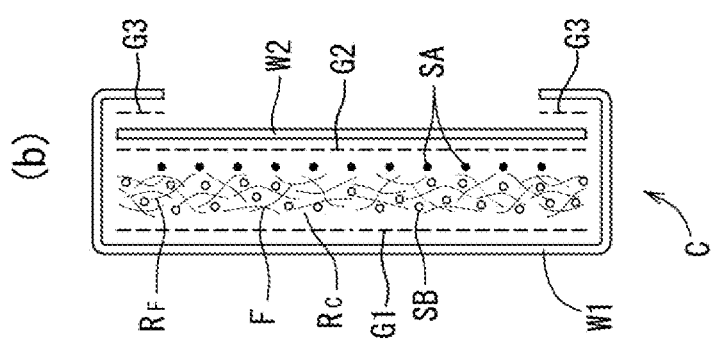

APPARATUS AND METHOD FOR MANUFACTURING ABSORBENT BODY

TECHNICAL FIELD

The present invention relates to an apparatus and a method for manufacturing an absorbent body of a disposable wearable article.

BACKGROUND ART

Regarding this type of absorbent body, such an absorbent body has been used in which a superabsorbent polymer called SAP is added to an aggregate (fiber body) of fibers of fibrillated pulp. Two methods as shown below have been known to add the SAP to the fiber body.

The first method is to mix the fibrillated pulp fibers with the SAP to convey the resultant mixture via an air flow in a duct so that the mixture is accumulated on an outer peripheral face of a fiber stacking drum.

According to the second method, pulp fibers are fiber-stacked on the outer peripheral face of the fiber stacking drum to subsequently spray the SAP over a layered body of fibers (see the following Publication 1).

CITATION LIST

Patent Literature

The first patent literature JP3,462,232 B (FIG. 4)
The second patent literature U.S. Pat. No. 4,995,141 B (Front page)

SUMMARY OF INVENTION

However, in the case of the first method, the mixture of the fibers and SAP conveyed via an air flow is found to be difficult to arrange the SAP in the absorbent body in an intermittent manner or to change the basis weight or the spraying width of the SAP.

For example, a part having a thicker fiber layer has a higher SAP basis weight. On the other hand, a uniform fiber layer has a uniform SAP basis weight. Specifically, there is a fixed relation between the fiber layer basis weight and the SAP basis weight.

Thus, it is an objective of the present invention to provide an apparatus and a method for manufacturing an absorbent body by which the basis weight and/or the distribution region of the SAP can be changed relative to the size and/or the basis weight of the fiber layer.

In the case of the second method, the SAP is sprayed while fibers being accumulated on the fiber stacking drum. Thus, there are problems that the SAP is caused to be scattered to the periphery due to the influence of an air flow from the duct which conveys the SAP via air, and that an intended SAP spraying pattern cannot be obtained. Particularly in the case of a known example shown in FIG. 12, a fiber stacking drum 100 includes a fiber stacking concave section 101 to fiber-stack fibers. Thus, a gap is inevitably caused between the concave section and a duct tip end to result in an air flow between the duct tip end and the concave section 101, which accelerates the above-described disadvantage.

Thus, it is another objective of the present invention to provide an apparatus and a method for manufacturing an absorbent body by which the SAP can be sprayed over the accumulated pulp fibers without causing the scattering of the SAP to the periphery and the SAP can have a different basis weight and spraying width and can be arranged in an intermittent manner.

In one aspect, the apparatus of the present invention includes:
- a duct 1 to convey fibrillated fibers F via an air flow;
- a first drum 10 to allow the fibers F conveyed through the duct 1 to be accumulated on an outer peripheral face 10F by the suction force from the interior to convey a fiber body $R_F$ of the accumulated fibers F, the first drum 10 being a first pattern drum to define the shape of the fiber body $R_F$;
- a spraying device 3 to spray (sprinkle) absorbent particles (granular powder) SA;
- a second drum 20 to convey an aggregate S obtained by collecting the sprayed particles SA on an outer peripheral face 20F by the suction force from the interior, the second drum 20 is a second pattern drum to control the distribution of the aggregate S; and
- a layering unit to layer the fiber body $R_F$ and the aggregate S to each other.

In one aspect, the method of the present invention includes:
- a fiber conveying step of conveying fibrillated fibers F by an air flow flowing in a duct 1;
- a fiber stacking step of allowing the fibers F conveyed through the duct 1 to be accumulated on an outer peripheral face 10F of a first drum 10 by the suction force of the first drum 10 from the interior to convey a fiber body $R_F$ of the accumulated fibers F;
- a spraying step of spraying absorbent particles (granular powder) SA from a spraying device 3;
- an aggregation step of conveying an aggregate S obtained by collecting the sprayed particles SA on an outer peripheral face 20F of a second drum 20 by the suction force of the second drum 20 from the interior; and
- a layering step to layer the fiber body $R_F$ and the aggregate S each other.

In these aspects, the first drum 10 having a template 51 allows the fibers F to accumulate on the first drum 10 to thereby generate the fiber body $R_F$. On the other hand, the second drum 20 having a perforated plate 61 provides the aggregation of the particles SA on the second drum 20 to thereby generate the aggregate S of the particles SA. Thus, the fiber body $R_F$ and the aggregate S can be mutually layered to thereby change the basis weight and the distribution of the SAP relative to the size and the basis weight of the fiber layer.

In another aspect, the apparatus of the present invention includes:
- a duct 1 to convey fibrillated fibers F by an air flow;
- a first drum 10 to accumulate the fibers F conveyed through the duct 1 on an outer peripheral face 10F via the suction force from the interior to convey a fiber body $R_F$ of the accumulated fibers F;
- a second drum 20 that is provided adjacent to the first drum 10 and that receives the fiber body $R_F$ from the first drum 10 to convey the fiber body $R_F$; and
- a spraying device 3 that sprays (sprinkles) the absorbent particles SA over the fiber body $R_F$ conveyed by the second drum 20 to thereby form an absorber layer $R_C$ including the fiber body $R_F$ and the particles SA.

In another aspect, the method of the present invention includes:
- a fiber conveying step of conveying the fibrillated fibers F via an air flow flowing in the duct 1;

a fiber stacking step of allowing the fibers F conveyed through the duct 1 to be accumulated on the outer peripheral face 10F of the first drum 10 by the suction force of the first drum 10 from the interior to convey a fiber body $R_F$ of the accumulated fibers F;

a fiber body transfer step of receiving, on the second drum 20 provided adjacent to the first drum 10, the fiber body $R_F$ sent from the first drum 10 and conveying the fiber body $R_F$ by the second drum 20; and a spraying step of allowing the spraying device 3 to spray the absorbent particles SA on the fiber body $R_F$ conveyed by the second drum 20 to thereby form an absorber layer $R_C$ including the fiber body $R_F$ and the particles SA.

In these aspects, instead of conveying the particles SA together with the fibers F by the air flow, the particles SA are sprayed on the fiber body $R_F$. Thus, the particles SA can be arranged in an intermittent manner or the particles SA can have a different basis weight or a different spraying width.

In particular, as the particles SA are sprayed (sprinkled) over the fiber body $R_F$ being conveyed by the second drum 20 different from the first drum 10 that fiber-stacks the fibers F from the duct 1, this arrangement eliminates the influence by the air flow from the duct while the particles SA being sprayed. Thus, the particles SA are mixed in the fiber body $R_F$ without causing the particles SA to be scattered to the periphery, thus easily providing an intended spraying pattern of the particles SA. The expression "accumulated on the outer peripheral face of the first drum" means to include a case where the fibers are directly accumulated on the outer peripheral face of the first drum and a case where the fibers are accumulated on the outer peripheral face of the first drum via the first carrier web conveyed on the outer peripheral face of the first drum.

BRIEF DESCRIPTION OF THE DRAWINGS

FIGS. 6(a), 6(b), and 6(c) illustrate one example of the manufacturing apparatus of Embodiment 4 of the present invention and a core and an absorbent body generated by the method. FIG. 6(a) is a plan view of the core. FIGS. 6(b) and 6(c) are a transverse sectional view of the absorbent body. FIG. 6(d) is a longitudinal sectional view of the absorbent body.

DESCRIPTION OF EMBODIMENTS

Figure 1:
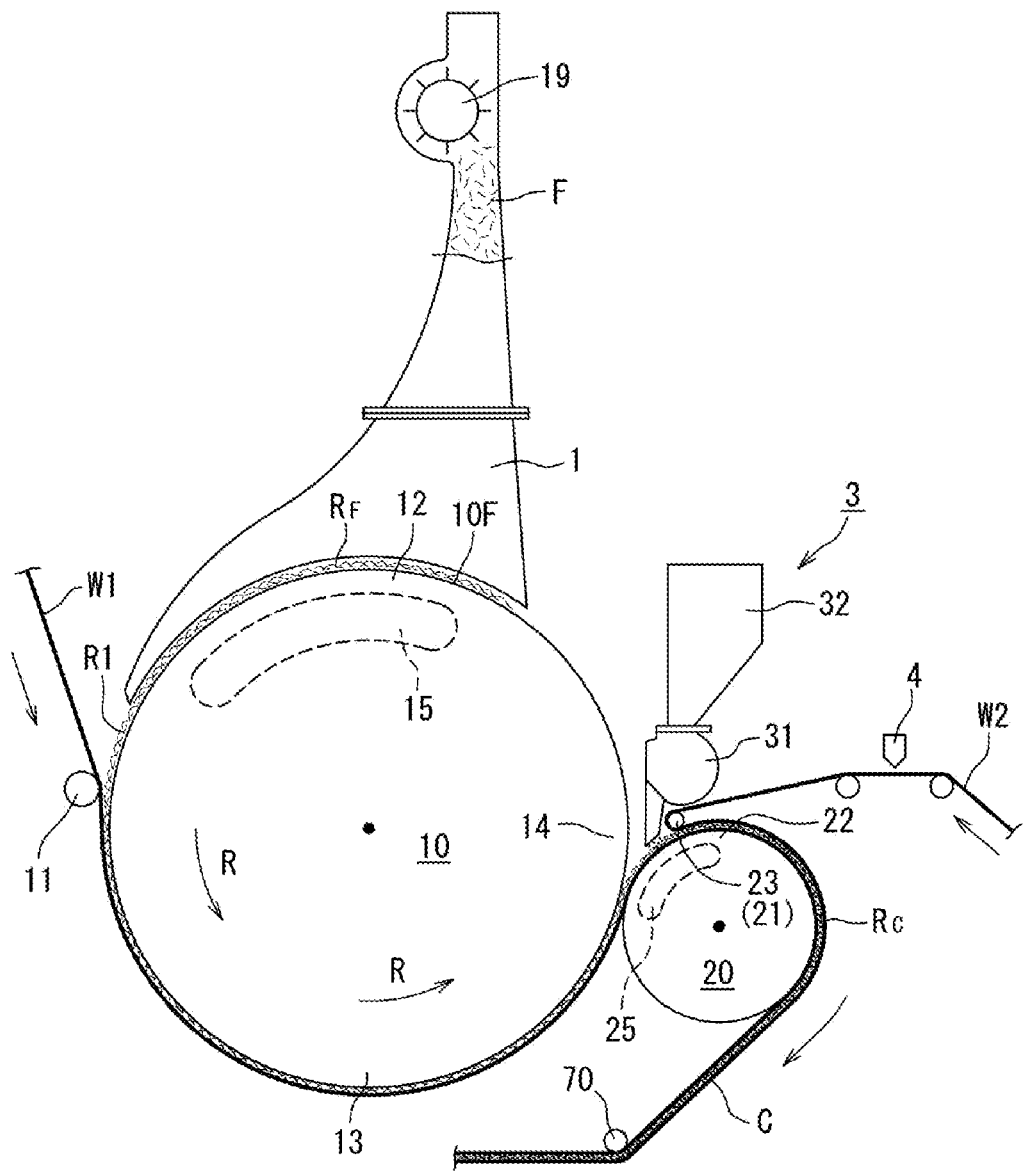
FIG. 1 is a schematic layout diagram of Embodiment 1 of an apparatus for manufacturing an absorbent body of the present invention.

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

Figure 2:
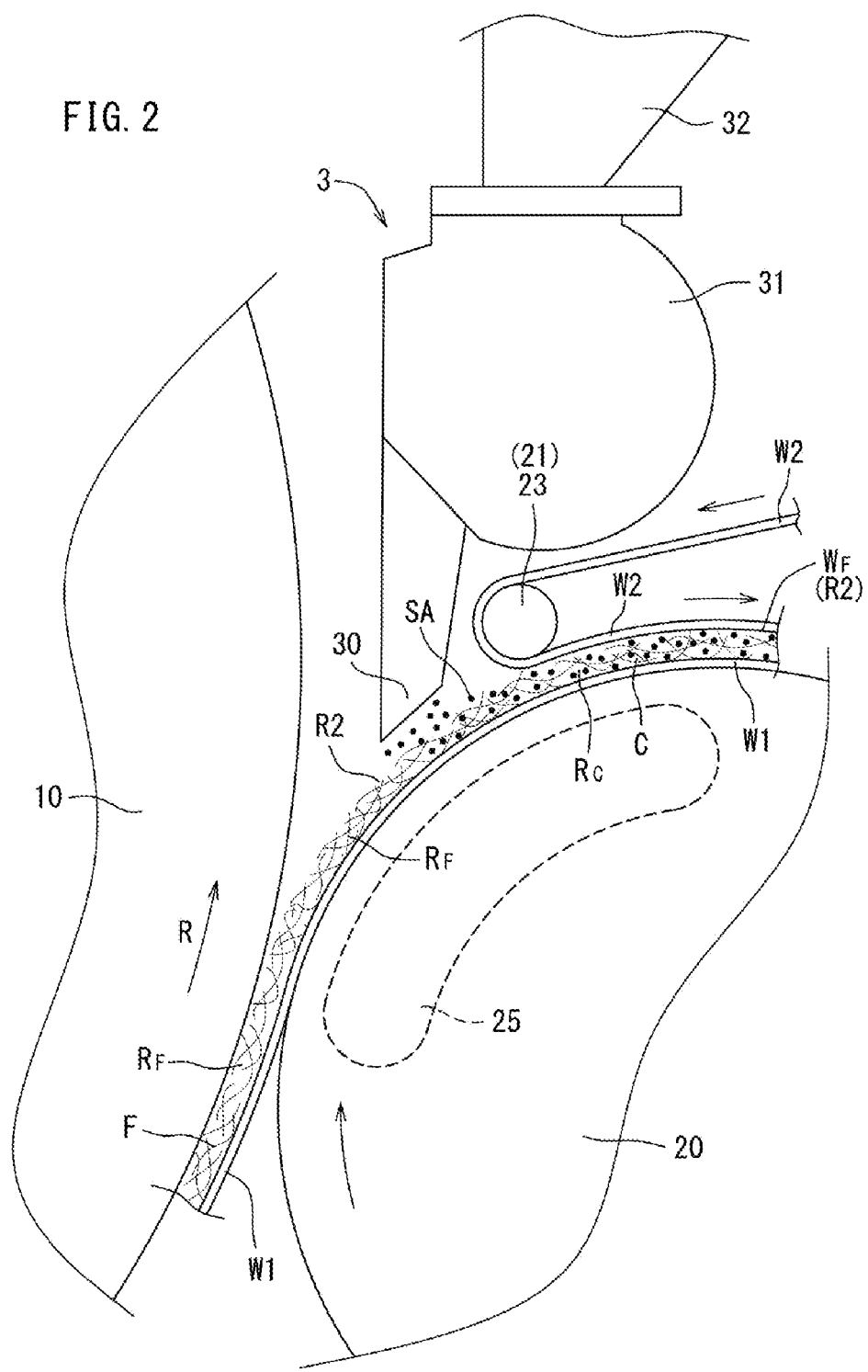
FIG. 2 is a schematic side view illustrating where the transfer is performed from the first drum to the second drum.
Figure 3:
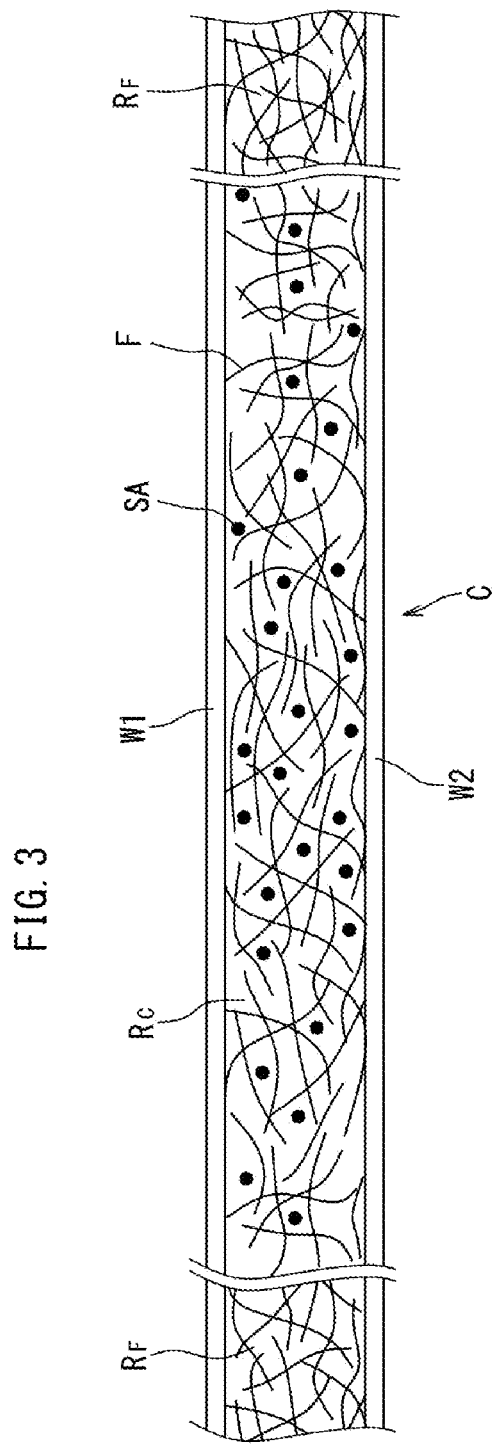
FIG. 3 is a schematic cross-sectional view illustrating the absorbent body in an enlarged manner.

The following section will describe the respective embodiments of the present invention. FIG. 1 to FIG. 3 illustrate Embodiment 1.

Prior to the description of the manufacturing apparatus, the following section will describe one example of the absorbent body generated by the manufacturing apparatus.

The absorbent body manufactured by the manufacturing apparatus is also called an absorbent core. The absorbent body is used as a core of disposable shorts or a diaper for example or as a core of an incontinence pad for example and has a sandglass-like shape, for example.

As shown in FIG. 3, the absorbent body C includes the absorber layer $R_C$ as well as the first and second carrier webs W1 and W2. The respective webs W1 and W2 may be a thin paper such as a tissue paper or may be a non-woven fabric.

The respective webs W1 and W2 may be arranged to sandwich the absorber layer $R_C$ and may cover the absorber layer $R_C$. The respective webs W1 and W2 have high diffusibility in a plane direction and thus can allow liquid to penetrate therethrough.

The absorber layer $R_C$ is obtained by mixing an infinite number (or a great number) of the particles SA called SAP with a fiber body $R_F$. The fiber body $R_F$ is an aggregate of fibers obtained by pulp fibrillation.

In FIG. 3, the absorbent body C may include the absorber layer $R_C$ and the fiber body $R_F$ not mixed with the particles SA. For example, each absorbent body C may be configured so that the particles SA are not mixed at both ends in the longitudinal direction or have a lower density at both ends. The absorbent body C also may be configured so that a part (e.g., a center part) in the longitudinal direction has the particles SA having a higher density and both sides have a lower density.

At least one of the webs W1 and W2 may be adhered to a surface of the fiber body $R_F$. As has been well known, the one pair of webs W1 and W2 surround the absorber layer $R_C$ and the fiber body $R_F$ and the absorbent body C constitutes a part of an individual wearable article.

As shown in FIG. 1, the manufacturing apparatus includes the duct 1 as a supply device, the first drum 10, the second drum 20, and the spraying device 3.

The duct 1 has a dome-like tip end and has a fibrillation device 19 at the upstream. The fibrillation device 19 fibrillates (or pulverizes) the pulp to have a fiber-like form to thereby prepare fluff pulp (fiber F). The duct 1 is filled with the fluff pulp and a suction room 15 of the first drum 10 is set to have a negative pressure, thereby allowing the fluff pulp to be fiber-stacked on the outer peripheral face 10F of the first drum 10.

The fibrillation and fiber stacking operations as described above are a well-known technique and are disclosed in JP2009-112438A, for example.

The spraying device 3 adds, as material constituting the absorbent body, high molecular compound particles called SAP (high absorption polymer particles) having a high absorption capacity.

Specifically, the first drum 10 for the fiber stacking operation of FIG. 1 continuously rotates in the circumferential direction R while sucking the fibers supplied from the duct 1 from the outer peripheral face 10F to the suction room 15 at the inner side to thereby continuously fiber-stack fibers on the outer peripheral face 10F of a fiber stacking concave section (not shown) and to convey the fiber body $R_F$ of the fibers F (FIG. 3) in the circumferential direction R.

At the downstream of the first drum 10 seen from the duct 1, the first introduction roller as the first introduction device 11 is provided. This first introduction device 11 introduces the first carrier web W1 to be superposed on fiber body $R_F$ along the first face R1 of the fiber body $R_F$ on the first drum 10 so as to cover the first face R1 of fiber body $R_F$ accumulated on the first drum 10.

The first face R1 is a face exposed to the exterior immediately after the fiber body $R_F$ is fiber-stacked.

The second drum 20 is provided adjacent to the first drum 10 and receives the fiber body $R_F$ together with the first carrier web W1 sent from the first drum 10 and conveys the fiber body $R_F$ and the first carrier web W1 while allowing the fiber body $R_F$ and the first carrier web W1 being sucked by the suction force from the interior (the suction room 25).

The second drum 20 may have an adsorption power higher than that of the first drum 10. Alternatively, when the fiber body $R_F$ is delivered from the first drum 10 to the second drum 20, the negative-pressure suction at a part of the first drum 10 at which the delivery is performed stops so that the fiber body $R_F$ is sucked to the second drum 20.

It is noted that the second drum 20 does not always have to suck and convey the fiber body $R_F$ and the first carrier web W1.

As clearly shown in FIG. 2, the spraying device 3 sprays an infinite number of (or a plurality of) absorbent particles SA over the fiber body $R_F$ being conveyed by being sucked to the second drum 20 to thereby form the absorber layer $R_C$ in which the particles SA are mixed with the fiber body $R_F$. It is noted that the particles SA are high water-absorbing polymer particles generally called SAP.

The absorber layer $R_C$ is sandwiched between the first carrier web W1 and the second carrier web W2. This second carrier web W2 is conveyed by the second introduction device 21. The second introduction device 21 includes the second introduction roller 23 and introduces the second carrier web W2 along the second face R2 of the absorber layer $R_C$ on the second drum 20. The second carrier web W2 is superposed on the second face R2 of the absorber layer $R_C$ to form the absorbent body C.

As shown in FIG. 2, the tip end opening 30 of the spraying device 3 is opened between the second introduction roller 23 and the first drum 10. Specifically, the tip end opening 30 of the spraying device 3 is opened over the second face R2 of the absorber layer $R_C$ conveyed by the second drum 20 at a position between the first drum 10 and the second introduction device 21. The particles SA are sprayed on the fiber body $R_F$ through the tip end opening 30 of the spraying device 3.

When the second drum 20 includes a suction room 25 at its interior to provide the suction by a negative pressure, the particles SA are allowed to enter the fiber body $R_F$ easily. When the suction room 25 is provided, the suction room 25 is preferably provided at a part opposed to the tip end opening 30 of the spraying device 3.

The spraying device 3 may have a supply control unit 31 and a hopper 32. The supply control unit 31 may control the supply amount of the particles SA fallen off through the tip end opening 30. The spraying device 3 may discharge the particles SA through the tip end opening 30 in an intermittent manner. Alternatively, the spraying device 3 may control the supply amount of the particles SA along the longitudinal (conveyance) direction of the fiber body $R_F$ so that the particles SA have a high density at the center part of the absorbent body C in the longitudinal direction or may spray the particles SA so as to change the basis weight in the width direction. Alternatively, the particles SA may be sprayed so as to change the spraying width in the width direction of the fiber body $R_F$ so that a sandglass-like shape is formed.

In the case of this embodiment, the second introduction roller 23 of FIG. 1 is provided at a position closer to the first drum 10 than the top part 22 of the second drum 20. In the case of this embodiment, the second carrier web W2 on the second introduction roller 23 is supplied to the second drum 20 along a conveyance path sharply curved like a hairpin.

In the case of this embodiment, the introduction path of the second carrier web W2 may have an applicator 4. The applicator 4 applies adhesive agent to a face functioning as the interior surface $W_F$ of the second carrier web W2 abutted to the absorber layer $R_C$ of FIG. 2.

It is noted that the adhesive agent also may be applied to the second face R2 of the fiber body $R_F$ or may be applied to a side providing the inner face of the absorbent body C of the first carrier web W1 of FIG. 1.

The absorber layer $R_C$ sandwiched between the respective webs W1 and W2 is output along an output roller 70 and is cut to units appropriate for the individual wearable articles.

Next, the following section will describe a method for manufacturing the absorbent body C.

In FIG. 1, the fibrillation device 19 continuously fibrillates the pulp to generate the fibers F called the fluff pulp. The fibrillated fibers F is conveyed by the air flow flowing in the duct 1.

The fibers F conveyed via the duct 1 is accumulated on the outer peripheral face 10F of the first drum 10 by the suction force from the interior of the first drum 10 (the suction room 15). The fiber body $R_F$ of the accumulated fibers is conveyed by the first drum 10 to thereby carry out a fiber stacking step.

For the convenience of the drawings, the fiber body $R_F$ of FIG. 1 is continuous in the circumferential direction R of the first drum 10. However, the fiber body $R_F$ of FIG. 1 also may be discontinuous to have lengths in units appropriate for the individual wearable articles. In this case, the outer periphery of the first drum 10 may have the well-known fiber stacking concave sections appropriate for the individual wearable articles.

On the other hand, the first carrier web W1 is introduced to the first drum 10. After the fiber stacking step, this first carrier web W1 is introduced along the first face R1 of the fiber body $R_F$ on the first drum 10 to be superposed on the fiber body $R_F$ so that the first face R1 of the fiber body $R_F$ accumulated on the first drum 10 is covered.

The first carrier web W1 and fiber body $R_F$ are conveyed to the second drum 20 along the circumferential direction R of the first drum 10. The second drum 20 of FIG. 2 receives the first carrier web W1 and the fiber body $R_F$ from the first drum 10 to perform the fiber body transfer step of allowing the second drum 20 to convey the fiber body $R_F$.

In this step, as shown in FIG. 2, the first carrier web W1 is provided at the inner side of the fiber body $R_F$ (the second drum 20 side), thus exposing the second face R2 of the fiber body $R_F$ at an opposite side of the first carrier web W1. The subsequent spraying step is carried out while the second face R2 of the fiber body $R_F$ being exposed.

In the spraying step of FIG. 2, the spraying device 3 sprays the absorbent particles SA over the fiber body $R_F$ being conveyed by being sucked by the second drum 20 to thereby form the absorber layer $R_C$ obtained by mixing the particles SA with the fiber body $R_F$.

In this spraying step, the particles SA are sprayed through the tip end opening 30 of the spraying device 3 on the fiber body $R_F$ at a position that is provided over the second face R2 of the absorber layer $R_C$ conveyed by the second drum 20 and that is between the first drum 10 and the second introduction device 21. The sprayed particles SA are mixed with the fiber body $R_F$.

On the other hand, the adhesive agent discharged from the applicator 4 of FIG. 1 is applied to a face functioning as the interior surface $W_F$ of the second carrier web W2 to be abutted to the absorber layer $R_C$. The interior surface $W_F$ of FIG. 2 coated with the adhesive agent is turned by the second introduction roller 23 and is introduced and adhered to the second face R2 of the absorber layer $R_C$.

Specifically, in the second introduction step of the second carrier web W2, the second carrier web W2 is introduced along the second face R2 of the absorber layer $R_C$ on the second drum 20. As a result, the second carrier web W2 is superposed on the second face R2 of the absorber layer $R_C$ conveyed over the second drum 20 together with the first carrier web W1 to thereby form the absorbent body C.

The absorber layer $R_C$ (i.e., the absorbent body C) sandwiched between the respective webs W1 and W2 is outputted along the output roller 70 of FIG. 1 and is cut to the units appropriate for the individual wearable articles and the resultant cut pieces are subsequently assembled to the wearable articles as a part of the wearable article in the well-known manner.

Figure 4:
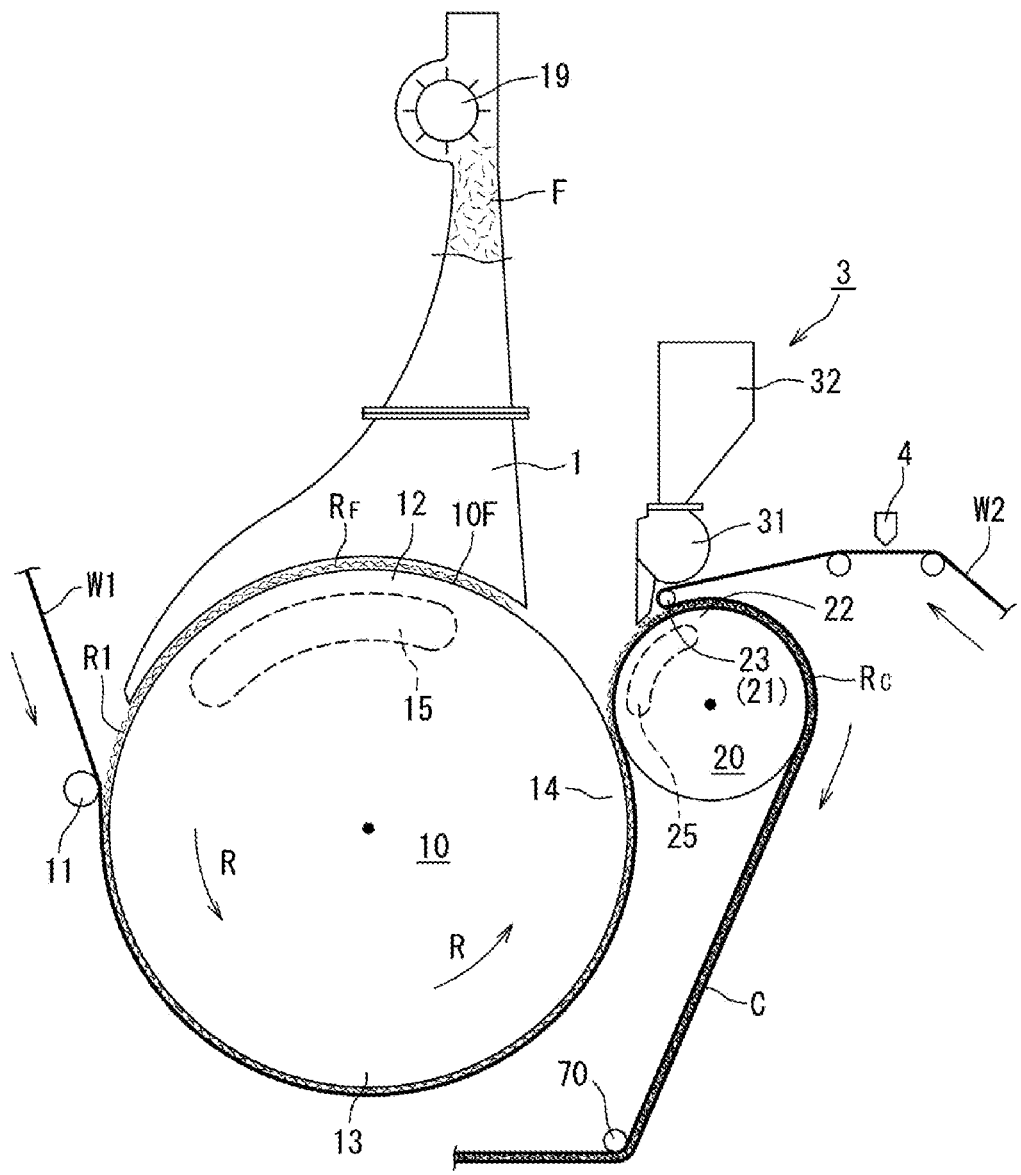
FIG. 4 is a schematic layout diagram illustrating Embodiment 2 of the apparatus.
Figure 5:
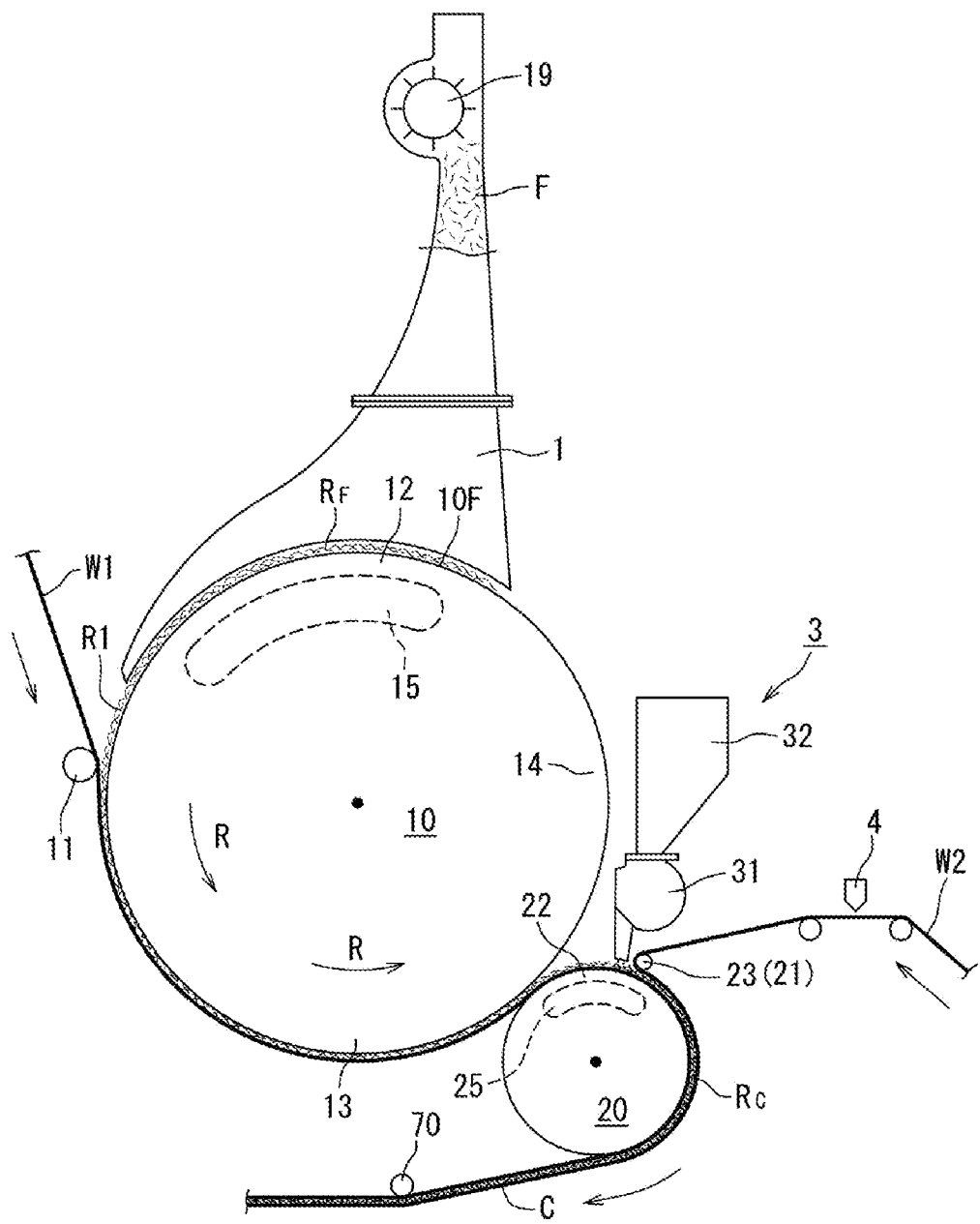
FIG. 5 is a schematic layout diagram illustrating Embodiment 3 of the apparatus.

FIG. 4 and FIG. 5 illustrate Embodiments 2 and 3 of the manufacturing apparatus, respectively.

As shown in FIG. 4, the second drum 20 may be provided over the side section 14 of the first drum 10. Alternatively, as shown in FIG. 5, the second drum 20 may be provided at the diagonally downward side of the first drum 10 except for the lower section 13 opposed to the top section 12 of the first drum 10. Specifically, the second drum 20 may be provided at the side section 14 side at an opposite side of the side at which the first introduction roller 11 is provided.

As shown in FIG. 1 and FIG. 4, the particles SA are preferably sprayed at a position closer to the first drum 10 than the top part 22 of the second drum 20. However, the particles SA also may be sprayed at a position as shown in FIG. 5 farther from the first drum 10 than the top part 22.

FIG. 7 to FIG. 10 illustrate Embodiment 4 of the manufacturing apparatus.

Prior to the description of the manufacturing apparatus of this embodiment, the following section will describe another example (FIG. 6) of the absorbent body manufactured by the manufacturing apparatus.

The absorbent body manufactured by the manufacturing apparatus is used as a core of disposable shorts and diaper as well as an incontinence pad for example and has a sandglass-like shape for example.

As shown in FIG. 6(d), the absorbent body C includes the absorber layer $R_C$ as well as the first and second carrier webs W1 and W2. The respective webs W1 and W2 may be a thin paper such as tissue paper or may be a non-woven fabric.

The respective webs W1 and W2 are provided so as to sandwich the absorber layer $R_C$ and may surround the absorber layer $R_C$. The respective webs W1 and W2 have high diffusibility in the plane direction and thus allows liquid to penetrate in a wide range.

The absorber layer $R_C$ includes an infinite number (or a great number) of the first and second particles SA and SB called SAP as well as the fiber body $R_F$. The fiber body $R_F$ is an aggregate of fibers of fibrillated pulp.

The first particles SA are attached to the interior surface $W_F$ of the second carrier web W2 via a layer of adhesive agent G2. On the other hand, the second particles SB are included in the fiber body $R_F$. The fiber body $R_F$ is attached to the interior surface $W_F$ of the first carrier web W1 via a layer of the adhesive agent G1.

As shown in FIGS. 6(b) to 6(d), the second particles SB are uniformly distributed in the width direction and the length direction of the absorber layer $R_C$. On the other hand, the first particles SA are distributed in a non-uniform manner.

For example, as shown in the plan view of the absorbent core of FIG. 6(a) for example, the front section, the center part, and the rear section may have the first particles SA that are uniformly distributed in the width direction and that are distributed in the length direction in a greater amount toward the front section.

On the contrary, an opposite configuration may be used in which the center part has the first particles SA arranged with a higher density and the front section and the rear section have the first particles SA arranged with a lower density.

As shown in FIGS. 6(b) and 6(c), the first carrier web W1 may be bent and may be adhered to the second carrier web W2 via adhesive agent G3. In this manner, the absorber layer $R_C$ is surrounded by one pair of webs W1 and W2 and the absorbent body C constitutes a part of an individual wearable article.

Figure 7:
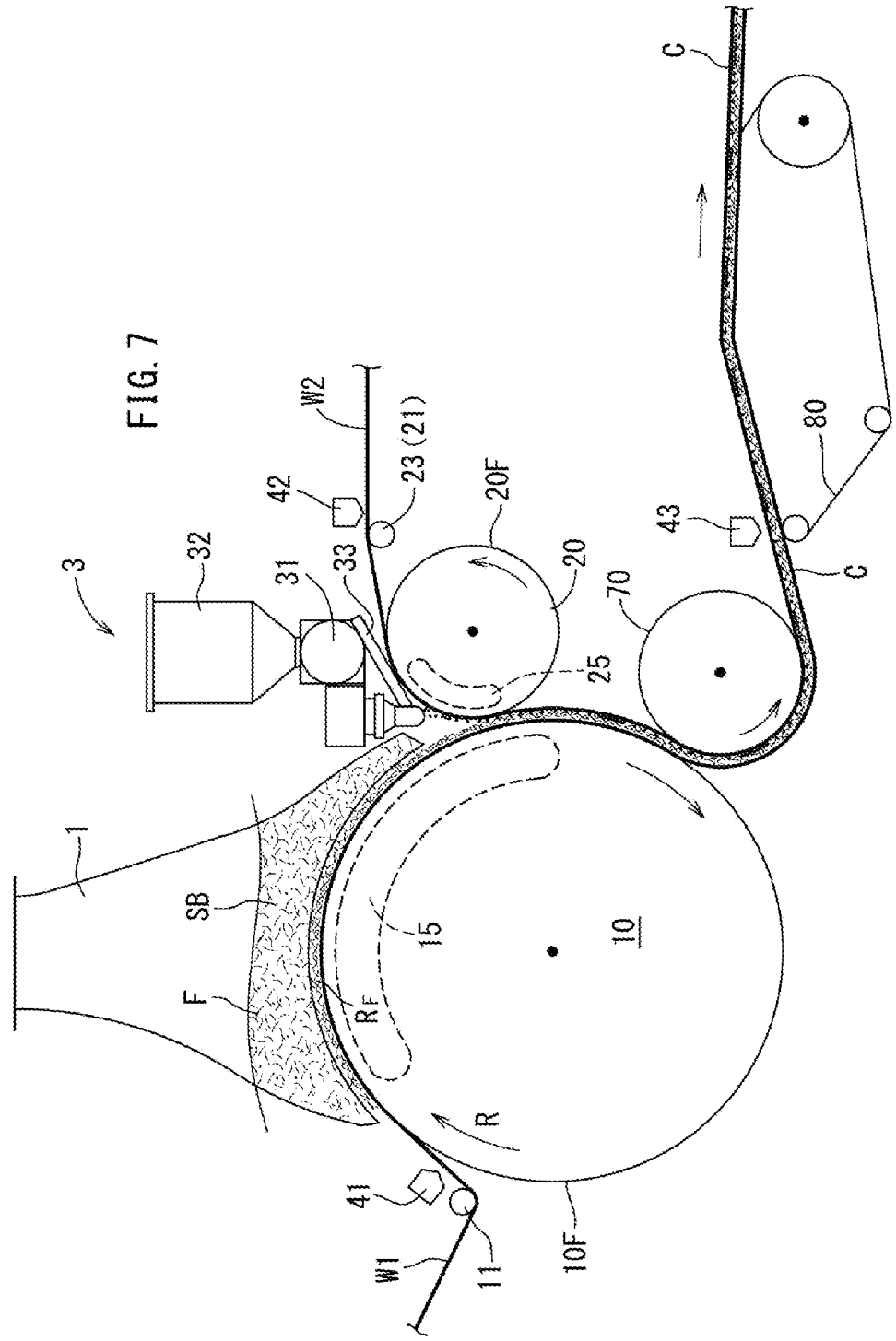
FIG. 7 is a schematic layout diagram illustrating Embodiment 4 of the apparatus.

As shown in FIG. 7, the manufacturing apparatus includes the duct 1 as a supply device, the first drum 10, the second drum 20, an output roller 70, and the spraying device 3. The manufacturing apparatus further includes the first and second introduction devices 11 and 21 as well as the first and second applicators 41 and 42.

The first drum 10 is the first pattern drum having the template 51 (FIG. 9) defining the shape of the fiber body $R_F$. On the other hand, the second drum 20 is the second pattern drum having the perforated plate 61 (FIG. 10) to control the distribution of the aggregate S.

Figure 9:
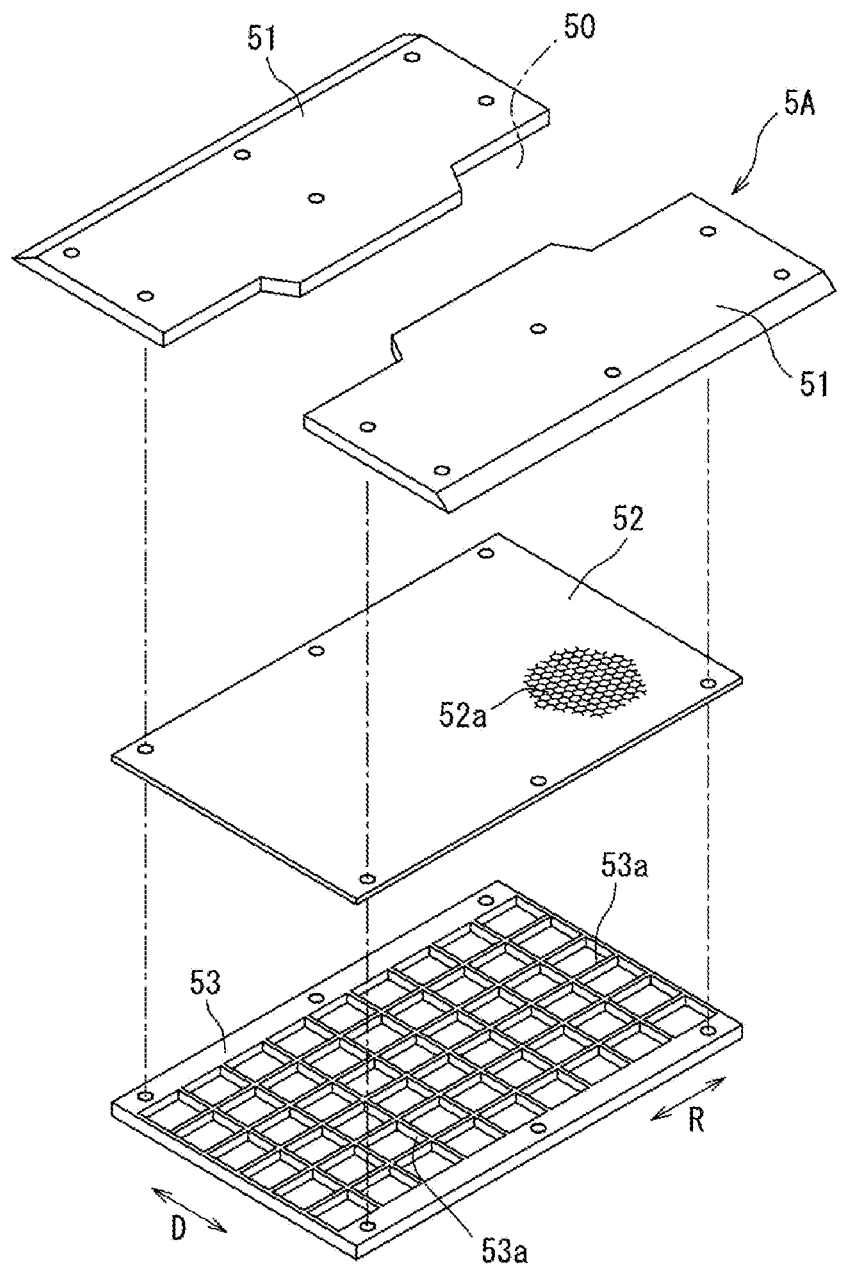
FIG. 9 is a schematic perspective view illustrating one example of a segment of the first drum.

The first drum 10 has a cylindrical section including a plurality of or a great number of the first segments 5A (FIG. 9). On the other hand, the second drum 20 has a cylindrical section including a plurality of or a great number of the second segments 5B (FIG. 10).

Figure 10:
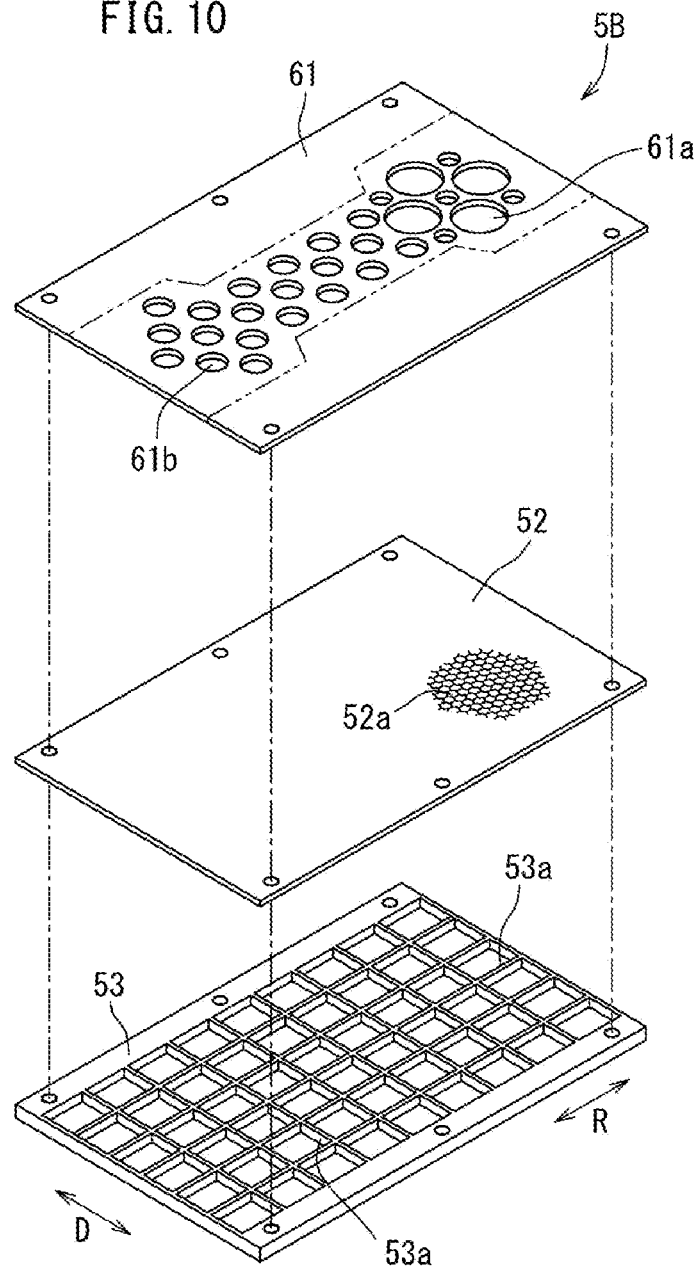
FIG. 10 is a schematic perspective view illustrating one example of the segment of the second drum.

For the convenience of the drawings, FIG. 9 and FIG. 10 illustrate the components of the respective segments 5A and 5B that are disassembled and arranged in a flat and developed manner. The respective segments 5A and 5B include a mesh member 52 and a grid member 53 for example. The grid member 53 is composed of a partition section 53a extending in longitudinal and lateral directions.

In FIG. 9, the mesh member 52 is obtained by subjecting a thin metal plate to the well-known etching processing to form a great number of or an infinite number of through holes 52a in the plate. The through holes 52a are set to have a size to allow air to pass therethrough and to receive the fibers F and the second particles SB. The first segment 5A has one pair of the templates 51 for example that is provided at the outer peripheral face side of the mesh member 52 to define a fiber stacking concave section 50.

Specifically, one pair of the templates 51 is mutually separated in the width direction D. A space therebetween defines the fiber stacking concave section 50. The fiber stacking concave section 50 includes therein fiber-stacked fibers F or the second particles SB to function as an absorbent core of an individual wearable article.

In FIG. 10, the second segment 5B includes a perforated plate 61 and the mesh member 52 and the grid member 53 described above. The perforated plate 61 has the first section 61a having a high numerical aperture in the circumferential direction and the second section 61b having a numerical aperture lower than the numerical aperture of the first section 61a. The difference between these numerical apertures provides different suction rates, thus providing the control of the density of the first particles SA.

In FIG. 7, the first and second drums 10 and 20 may not have to have these segments.

In FIG. 7, the first introduction device 11 introduces the first carrier web W1 along the outer peripheral face 10F of the first drum 10 at the upstream of the duct 1. The second introduction device 21 introduces the second carrier web W2 along the outer peripheral face 20F of the second drum 20 at the upstream of the spraying device 3.

The first the applicator 41 applies adhesive agent to the surface of the first carrier web W1 introduced to the first drum 10. The second the applicator 42 applies adhesive agent to the surface of the second carrier web W2 introduced to the second drum 20.

In FIG. 7, the duct 1 has a dome-like tip end at the upstream and has a fibrillation device (see FIG. 1). The fibrillation device allows the duct 1 to be filled with the fibrillated fluff pulp (fibers F). The suction room 15 of the first drum 10 set to have a negative pressure allows the fibrillated fluff pulp (fibers F) to be fiber-stacked on the first carrier web W1 on the outer peripheral face 10F of the first drum 10. The fibrillation and fiber stacking as described above are a well-known technique and are disclosed in JP2009-112438A for example.

Added to the interior of the duct 1 is the second particles SB as material constituting the absorbent body. It is noted that the second particles SB may not be added.

In FIG. 7, the first drum 10 for the fiber stacking operation sucks the fibers F and the second particles SB supplied from the duct 1 from the outer peripheral face 10F to the suction room 15 at the inner side while being continuously rotated in the circumferential direction R to thereby to continuously fiber-stack the fibers F and the second particles SB on the outer peripheral face 10F of a fiber stacking concave section (not shown) via the first carrier web W1 and conveys the fiber body $R_F$ (FIG. 8) of the fibers F in the circumferential direction R.

On the rotation path of the first drum 10, the second drum 20 is provided at the downstream from the duct 1. After the second applicator 42 applies the adhesive agent to the surface of the second carrier web W2, the second introduction device 21 (the second introduction roller 23) introduces the second carrier web W2 to the second drum 20.

Figure 8:
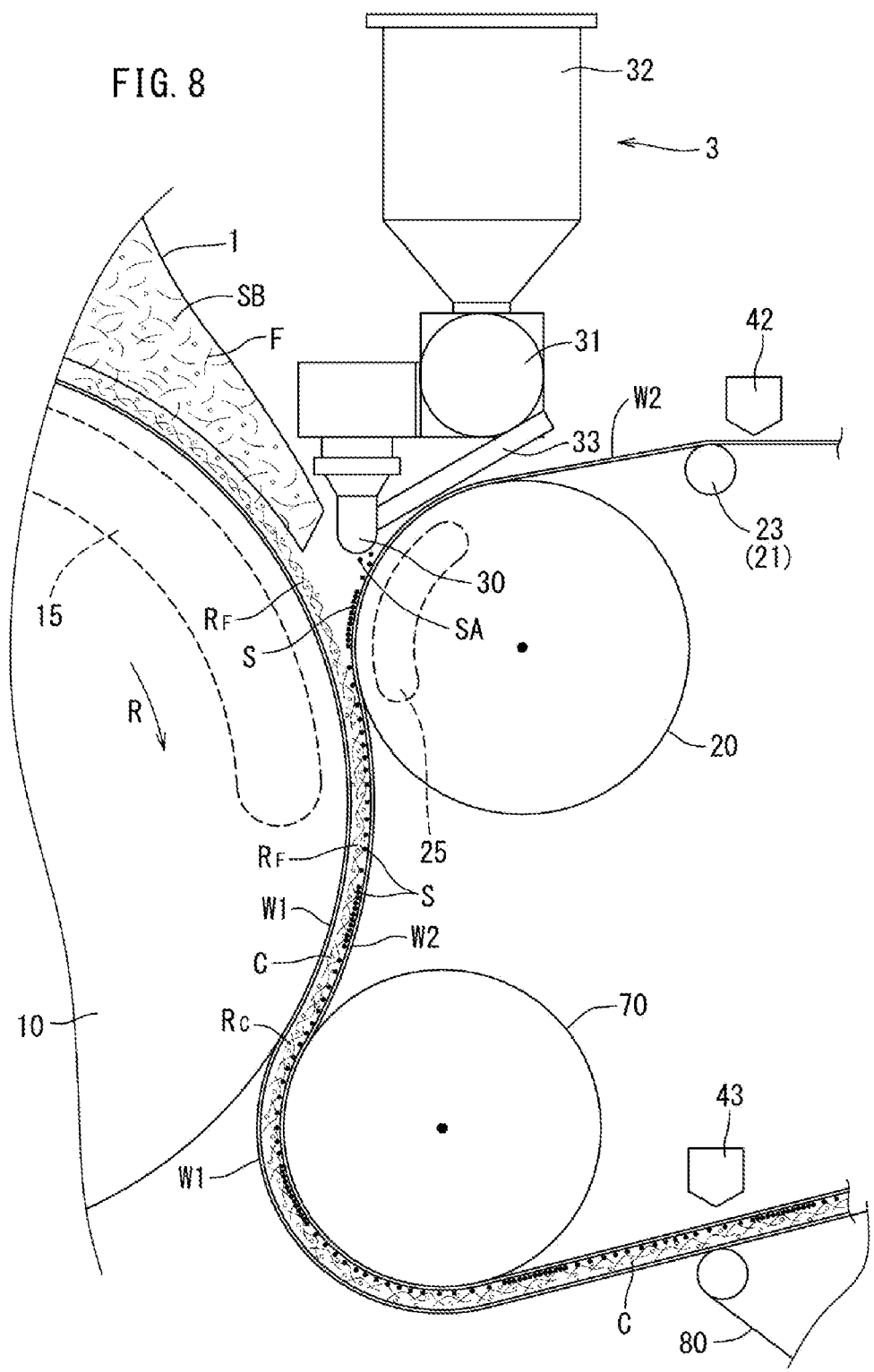
FIG. 8 is a schematic side view illustrating a layering unit of the apparatus in an enlarged manner.

As shown in FIG. 8, the first particles SA are sprayed over the second carrier web W2 coated with the adhesive agent on the second carrier web W2. The second carrier web W2 and the first particles SA are sucked to the inner side by the negative pressure from the suction room 25 of the second drum 20 and are retained on the outer peripheral face of the second drum 20.

As shown in FIG. 7, the first drum 10 and the second drum 20 are provided to be adjacent to each other. As shown in FIG. 8, the first drum 10 receives, from the second drum 20, the second carrier web W2 on which the first particles SA are attached. The first drum 10 sucks the fiber body $R_F$ on the first carrier web W1 by the suction force from the suction room 15 of the first drum 10 to attract the second carrier web W2, to which the second particles SB are attached, to the first carrier web W1 and the second particles SB, and the first drum 10 conveys the first carrier web W1 and the second carrier web W2 in this manner.

The first drum 10 may have an adsorption power higher than that of the second drum 20. When the second carrier web W2 is delivered from the second drum 20 to the first drum 10, the suction by the second drum via a negative pressure may be stopped at a part at which the delivery is performed and the first drum 10 may suck the second carrier web W2.

As clearly shown in FIG. 8, the spraying device 3 sprays an infinite number of (or a plurality of) the particles SA as an absorbent over the second carrier web W2 being sucked and conveyed by the second drum 20 so that the first particles SA are attached to the second carrier web W2.

It is noted that the first particles SA are particles of high water-absorbing polymer generally called SAP.

The absorber layer $R_C$ is sandwiched between the first carrier web W1 and the second carrier web W2. The second carrier web W2 is conveyed by the second introduction device 21. The second introduction device 21 includes the second introduction roller 23 and introduces the second carrier web W2 along the second drum 20. The second carrier web W2 is superposed on the absorber layer $R_C$, to form the absorbent body C.

As shown in FIG. 8, the tip end opening 30 of the spraying device 3 is opened between the second drum 20 and the first drum 10.

Specifically, the tip end opening 30 is provided in an area where the second drum 20 and the first drum 10 are abutted to each other via the first carrier web W1, the absorber layer $R_C$, and the second carrier web W2 and the area is defined by a Δ-shaped (reversed Δ-shaped) region between the second drum 20 and the first drum 10. The tip end opening 30 is provided at the lower side than the top of the second drum 20 (the top in the upper direction of the drawing). The tip end opening 30 is provided at a position opposed to the suction room 25 of the second drum 20.

The spraying device 3 has a supply control unit (feeder) 31, the hopper 32, and a shutter 33. The supply control unit 31 may control the supply amount of the first particles SA fallen through the tip end opening 30. The spraying device 3 may discharge the first particles SA through the tip end opening 30 in an intermittent manner. Specifically, the shutter 33 may be used to open or close the tip end opening 30 to thereby provide the intermittent discharge of the first particles SA. Alternatively, the spraying device 3 may spray the first particles SA so that the basis weight is changed in the longitudinal (conveyance) direction and/or the width direction of the fiber body $R_F$.

Alternatively, the first particles SA may be sprayed to provide a sandglass-like shape, for example, by changing the spraying width in the width direction of the fiber body $R_F$.

In FIG. 7, the first and second the applicators 41 and 42 apply adhesive agents G1 and G2 to the faces functioning as the respective interior surface $W_F$ abutted to the absorber layer $R_C$ in the first and second carrier webs of FIG. 6(d).

In FIG. 7, the output roller 70 outputs the absorbent body C based on the first drum 10. The output roller 70 has, at the downstream thereof, the third applicator 43 to apply the adhesive agent G3 (FIG. 6(c)) to the second carrier web W2 and a folder 80 to fold the first carrier web W1.

The absorber layer $R_C$ sandwiched between the respective webs W1 and W2 is outputted along the output roller 70. The first carrier web W1 is folded by the folder 80 and is subsequently cut to the units appropriate for the individual wearable articles.

Next, the following section will describe the method for manufacturing the absorbent body C.

In FIG. 7, the first carrier web W1 is introduced along the outer peripheral face 10F of the first drum 10 at the upstream of the duct 1 so that the fiber body $R_F$ is fiber-stacked on the first carrier web W1.

On the other hand, the second carrier web W2 is introduced along the outer peripheral face 20F of the second drum 20 at the upstream of the spraying device 3 so that the first particles SA are collected on the second carrier web W2 (FIG. 8).

The first applicator 41 applies the adhesive agent G1 (FIG. 6(d)) to the surface of the first carrier web W1 introduced to the first drum 10. On the other hand, the second applicator 42 applies the adhesive agent G2 (FIG. 6(d)) to the surface of the second carrier web W2 introduced to the second drum 20.

In the fiber stacking conveying step shown in FIG. 8, the second particles SB having an absorbent property are added to the fibers F in the duct 1 to convey the fibers F and the second particles SB via the air flow flowing in the duct. The second particles SB and the fibers F are accumulated on the first carrier web W1 on the outer peripheral face 10F of the first drum 10 in the fiber stacking conveying step.

As shown in FIG. 8, the fibers F and the second particles SB conveyed via the duct 1 are caused by the suction force from the interior of the first drum 10 (the suction room 15) to be accumulated on the first carrier web W1 on the outer peripheral face 10F of the first drum 10 to thereby convey the fiber body $R_F$ of the accumulated fibers F and second particles SB.

On the other hand, the sprayed first particles SA are caused by the suction force from the interior of the second drum 20 (the suction room 25) to be attached to the second carrier web W2 on the second drum 20 and are conveyed as the aggregate S.

The fiber body $R_F$ and the aggregate S are mutually layered on the first drum.

Specifically, the second carrier web W2 and the first particles SA sucked to the second drum 20 are sucked to the first drum 10 via the first carrier web W1 and fiber body $R_F$ to convey the absorbent body C including the first carrier web W1, the fiber body $R_F$, the first particles SA and the second carrier web W2 by the first drum 10.

For the convenience of the drawings, the fiber body $R_F$ of FIG. 7 is continuous in the circumferential direction R of the first drum 10. However, the fiber body $R_F$ of FIG. 7 also may be discontinuous and may have a length appropriate for the unit of an individual wearable article. In this case, the outer periphery of the first drum 10 may have the well-known fiber stacking concave section appropriate for the unit of an individual wearable article.

As shown in FIG. 8, the absorber layer $R_C$ sandwiched between the webs W1 and W2 (i.e., the absorbent body C) is outputted along the output roller 70. The folder 80 of FIG. 7 is used to fold the first carrier web W1 as shown in FIGS. 6(b) and 6(c). Thereafter, the absorbent body C is cut to the unit appropriate for an individual wearable article for example and the resultant piece is assembled in a wearable article as a part of the wearable article in the well-known manner.

Figure 11:
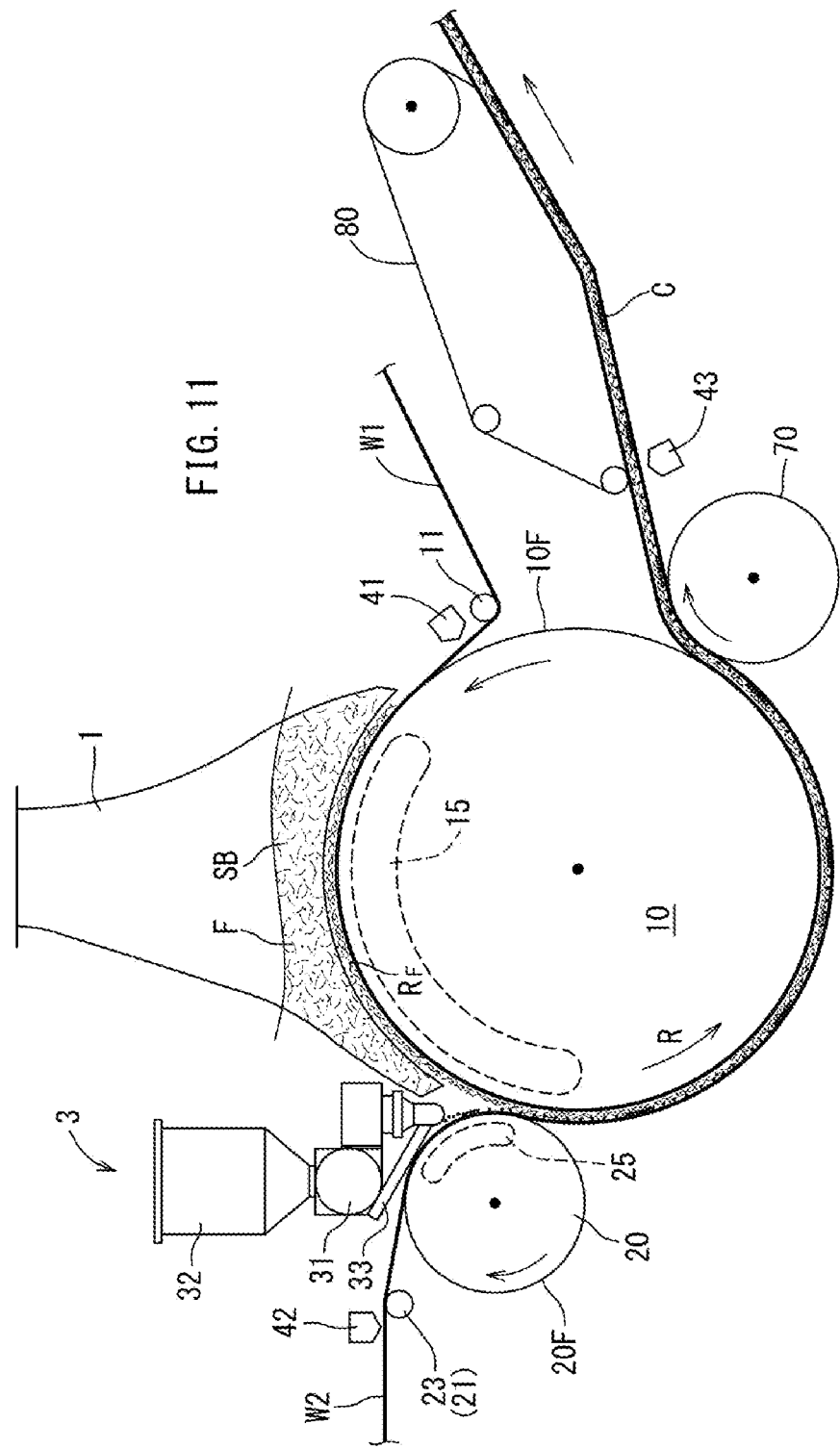
FIG. 11 is a schematic layout diagram illustrating Embodiment 5 of the apparatus.
Figure 12:
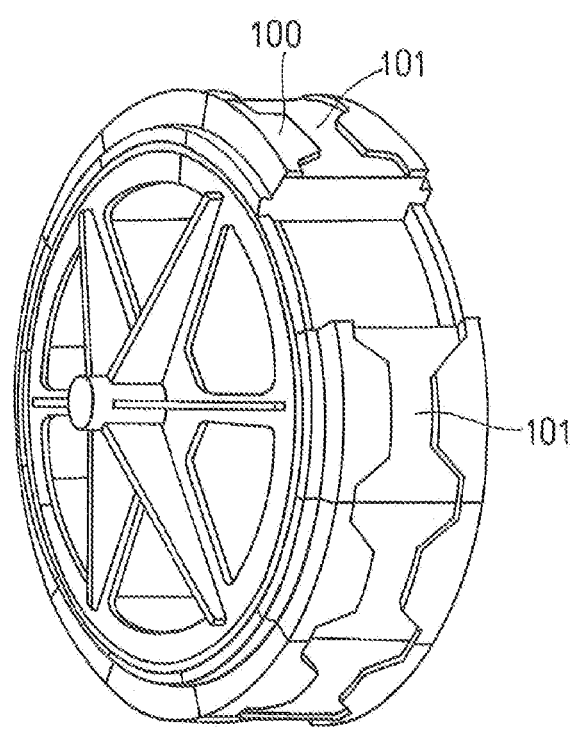
FIG. 12 is a perspective view illustrating one example of a known fiber stacking drum.

FIG. 11 illustrates Embodiment 5 of the manufacturing apparatus.

As shown in this drawing, the generated absorbent body C may be outputted to the side at which the first carrier web W1 is introduced (the first introduction device 11 side). It is noted that, in Embodiment 4 of FIG. 7, the generated absorbent body C is outputted to the side at which the second carrier web W2 is introduced (the second introduction device 21 side). By selecting one of the layouts of FIG. 7 and FIG. 11, an arrangement appropriate for the wearable article manufacture line can be selected.

The other details for the structure and the method for manufacturing the absorbent body are similar to those of Embodiment 4 and thus will not be further described.

The respective embodiments described above mainly include the invention having a configuration described below.

In one of the above-described aspects, a preferred manufacturing apparatus further includes: the first introduction device 11 to introduce the first carrier web W1 along the outer peripheral face 10F of the first drum 10 at the upstream of the duct 1; and the second introduction device 21 to introduce the second carrier web W2 along the outer peripheral face 20F of the second drum 20 at the upstream of the spraying device 3.

In one of the above-described aspects, a preferred manufacturing method further includes: the first introduction step of introducing the first carrier web W1 along the outer peripheral face 10F of the first drum 10 at the upstream of the duct 1 so that the fiber body $R_F$ is fiber-stacked on the first carrier web W1; and the second introduction step of introducing the second carrier web W2 along the outer peripheral face 20F of the second drum 20 at the upstream of the spraying device 3 so that the particles SA are collected on the second carrier web W2.

In these cases, the first carrier web W1 covers one face of the fiber body $R_F$ and the second carrier web W2 retains the first particles SA. Thus, the absorber layer is in a state being sandwiched between both of the webs, thus promoting the prevention of the falling or dropping of the first particles SA.

In one of the above-described aspects, a further preferred manufacturing apparatus further includes: the first the applicator 41 to apply adhesive agent to the surface of the first carrier web W1 to be introduced to the first drum 10; and the second the applicator 42 to apply the adhesive agent to the surface of the second carrier web W2 to be introduced to the second drum 20.

In one of the above-described aspects, a further preferred manufacturing method further includes: the first application step of allowing the first applicator 41 to apply the adhesive agent to the surface of the first carrier web W1 to be introduced to the first drum 10; and the second application step of allowing the second applicator 42 to apply the adhesive agent to the surface of the second carrier web W2 to be introduced to the second drum 20.

In these cases, the adhesive agent applied to the first and second carrier webs W1 and W2 by the first and second applicators 41 and 42 allows the aggregate S of the fiber body $R_F$ and the first particles SA to be attached to the respective webs W1 and W2, thus further preventing the fibers F or the first particles SA from falling or dropping.

In one of the above-described aspects, according to a further preferred manufacturing method, the fiber conveying step adds the second particles SB having an absorbent property to the fibers F in the duct 1 to convey the fibers F and the second particles SB by the air flow flowing in the duct. The second particles SB and the fibers F are accumulated on the outer peripheral face 10F of the first drum 10 in the fiber stacking step.

In this case, the second particles SB are mixed in the fiber body $R_F$ in a separated manner from the first particles SA attached to the second carrier web W2. Thus, the particles are entirely distributed in the thickness direction of the absorber layer $R_C$, thus providing a stable liquid absorption function.

In another aspect of the above-described aspects, a preferred manufacturing apparatus includes: the first introduction device 11 to introduce the first carrier web W1 to be superposed on the fiber body $R_F$ along the first face R1 of the fiber body $R_F$ on the first drum 10 so that the first face R1 of the fiber body $R_F$ accumulated on the first drum 10 is covered; and the second introduction device 21 to introduce the second carrier web W2 along the second face R2 of the absorber layer $R_C$ on the second drum 20, the first carrier web W1 as well as the second carrier web W2 superposed on the second face R2 of the absorber layer $R_C$ being conveyed over the second drum 20 to form the absorbent body C.

On the other hand, in another aspect of the above-described aspects, a preferred method includes the first introduction step to introduce the first carrier web W1 superposed on the fiber body $R_F$ along the first face R1 of the fiber body $R_F$ on the first drum 10 so as to cover the first face R1 of the fiber body $R_F$ accumulated on the first drum 10; and the second introduction step to introduce, along the second face R2 of the absorber layer $R_C$ on the second drum 20, the second carrier web W2 forming the absorbent body C while being superposed on the second face R2 of the absorber layer $R_C$ conveyed on the second drum 20 together with the first carrier web W1.

In these cases, the first carrier web W1 covers the first face R1 of the fiber body $R_F$, thus preventing the fibers F constituting the fiber body $R_F$ from being scattered to the periphery. On the other hand, the second face R2 of the absorber layer $R_C$ covered by the second carrier web W2 allows the absorber layer $R_C$ to be sandwiched between the webs, thus preventing the first particles SA from falling or dropping.

The first face R1 is an exposed face of the fiber body being conveyed by the first drum while the second face R2 is an exposed face of the absorber layer being conveyed by the second drum (a face at an opposite side of the first face R1).

In the other aspect, according to a further preferred manufacturing apparatus, at a position that is provided over the second face R2 of the absorber layer $R_C$ conveyed by the second drum 20 and that is between the first drum 10 and the second introduction device 21, the tip end opening 30 of the spraying device 3 is opened and the first particles SA are sprayed on the fiber body $R_F$ through the tip end opening 30 of the spraying device 3.

On the other hand, in the other aspect, according to a further preferred method, at a position that is provided over the second face R2 of the absorber layer $R_C$ conveyed by the second drum 20 and that is between the first drum 10 and a position to introduce the second carrier web W2, the first particles SA are sprayed on the fiber body $R_F$ through the tip end opening 30 of the spraying device 3 to thereby carry out the spraying step.

In these cases, the first particles SA can be sprayed on the fiber body $R_F$ in a narrow space in which the first drum 10 and the second drum 20 are close to each other via the fiber body $R_F$. Thus, the first particles SA can be further suppressed from being scattered to the periphery.

In the other aspect, according to a more preferred manufacturing apparatus, the second introduction device 21 includes (the second) introduction roller 23 to introduce the second carrier web W2 to the second drum 20. The tip end opening 30 is opened between (the second) introduction roller 23 and the first drum 10.

In this case, the entire device may easily have a compact size.

It is noted that the applicator 4 may be further provided that applies the adhesive agent to a face of the second carrier web W2 functioning as the interior surface $W_F$ abutted to the absorber layer $R_C$. An application step may be further included to apply the adhesive agent to a face of the second carrier web W2 functioning as the interior surface $W_F$ abutted to the absorber layer $R_C$.

The features described and/or illustrated in relation to the above respective embodiments can be used in the same or similar manner in one or more other embodiments and/or in combination with other embodiments or instead of these embodiments.

As described above, preferred embodiments have been described with reference to the drawings. However, it will be obvious for those skilled in the art to easily find various changes and modifications within an obvious scope based on this specification.

For example, adhesive agent may be applied to the first carrier web to adhere the first carrier web to the fiber body or no adhesive agent may be applied.

Alternatively, one carrier web may be used to wrap the fiber body.

Thus, such changes and modifications are interpreted as being within the scope of the present invention determined based on claims.

INDUSTRIAL APPLICABILITY

The present invention can be applied to the manufacture of various absorbent bodies such as disposable shorts and diapers.

| Reference Signs List | | | |
|---|---|---|---|
| 1: Duct | | | |
| 10: First drum | 10F: Outer peripheral face | | 20: Second drum |
| 20F: Outer peripheral face | | | |
| 11: First introduction device | | 21: Second introduction device | |
| 12: Top section | 13: Lower section | 14: Side section | 15: Suction room |
| 19: Fibrillation device | | | |
| 22: Top part | 23: (Second) introduction roller | | 25: Suction room |
| 3: Spraying device | 30: Tip end opening | 31: Supply control room | |
| 32: Hopper | 33: Shutter | | |
| 4: Applicator | 41: First applicator | 42: Second applicator | |
| 5A, 5B: Segment | 50: Fiber stacking concave section | | 51: Template |
| 52: Mesh member | | | |

| Reference Signs List | |
|---|---|
| 53: Grid member | 53a: Crosspiece |
| 61: Perforated plate | |
| 70: Output roller | 80: Folder |
| C: Absorbent body | |
| S: Aggregate | SA: First particles    SB: Second particles |
| F: Fibers | |
| $R_F$: Fiber body | $R_C$: Absorber layer    R1: First face    R2: Second face |
| W1: First carrier web | W2: Second carrier web |

The invention claimed is:

1. A manufacturing apparatus of an absorbent body, comprising:
a duct configured to convey fibrillated fibers via an air flow;
a first drum in which a first suction room configured to have a negative pressure is formed, the first drum being configured to accumulate the fibrillated fibers on an outer peripheral face of the first drum by a first suction force from the first suction room arranged in an interior of the first drum, and to convey a fiber body of the accumulated fibers, the first drum being a first pattern drum to define the shape of the fiber body;
a spraying device configured to spray absorbent particles; and
a second drum in which a second suction room configured to have a negative pressure is formed, the second drum being configured to convey an aggregate formed by collecting the absorbent particles from the spraying device on an outer peripheral face of the second drum by a second suction force from the second suction room arranged in an interior of the second drum, the second drum being a second pattern drum to control the distribution of the aggregate, wherein:
the first drum and the second drum are arranged close to each other,
the fiber body and the aggregate being layered on each other at a location where the outer peripheral face of the first drum faces the outer peripheral face of the second drum;
an opening of the spraying device for spraying the absorbent particles is arranged to face the second suction room of the second drum via the outer peripheral face of the second drum,
the second drum is arranged downstream of the duct in a rotational direction of the first drum,
the opening of the spraying device is disposed:
above the location where the outer peripheral face of the first drum faces the outer peripheral face of the second drum opposite each other and where the fiber body and the aggregate are layered on each other, and
in an area interposed between the first drum and the second drum when viewed along an axis of rotation of the first drum; and
the first suction force is higher than the second suction force.

2. The manufacturing apparatus of an absorbent body according to claim 1, further comprising:
a first introduction roller configured to introduce a first carrier web along the outer peripheral face of the first drum upstream of the duct; and
a second introduction roller configured to introduce a second carrier web along the outer peripheral face of the second drum upstream of the spraying device.

3. The manufacturing apparatus of an absorbent body according to claim 2, further comprising:
a first applicator configured to apply an adhesive agent to a surface of the first carrier web W1 introduced to the first drum; and
a second applicator configured to apply the adhesive agent to a surface of the second carrier web introduced to the second drum.

4. A method for manufacturing an absorbent body, comprising:
a fiber conveying step of conveying fibrillated fibers by an air flow flowing in a duct;
a fiber stacking step of accumulating the fibers conveyed through the duct on an outer peripheral face of a first drum by a first suction force of the first drum from a first suction room arranged in an interior of the first drum to convey a fiber body of the accumulated fibers;
a spraying step of spraying absorbent particles from a spraying device;
an aggregation step of conveying an aggregate formed by collecting the absorbent particles from the spraying device on an outer peripheral face of a second drum by a second suction force of the second drum from a second suction room arranged in an interior of the second drum; and
a layering step of layering the fiber body and the aggregate on each other, wherein:
an opening of the spraying device for spraying the absorbent particles is arranged to face the second suction room of the second drum via the outer peripheral face of the second drum,
the second drum is arranged downstream of the duct in a rotational direction of the first drum,
the opening of the spraying device is disposed:
above the location where the outer peripheral face of the first drum faces the outer peripheral face of the second drum opposite each other and where the fiber body and the aggregate are layered on each other, and
in an area interposed between the first drum and the second drum when viewed along an axis of rotation of the first drum; and
the first suction force is higher than the second suction force.

5. The method for manufacturing an absorbent body according to claim 4, further comprising:
a first introduction step of introducing a first carrier web along the outer peripheral face of the first drum upstream of the duct so that the fiber body is fiber-stacked on the first carrier web; and
a second introduction step of introducing a second carrier web along the outer peripheral face of the second drum upstream of the spraying device so that the particles are collected on the second carrier web.

6. The method for manufacturing an absorbent body according to claim 5, wherein:
   in the fiber conveying step, absorbent particles are added to the fibers in the duct, and the fibers and the particles are conveyed by the air flow flowing in the duct; and
   in the fiber stacking step, the particles and the fibers are accumulated on the outer peripheral face of the first drum.

7. The method for manufacturing an absorbent body according to claim 5, further comprising:
   a first application step of applying an adhesive agent with a first applicator to a surface of the first carrier web introduced to the first drum; and
   a second application step of applying the adhesive agent with a second applicator to a surface of the second carrier web introduced from the second drum.

8. The method for manufacturing an absorbent body according to claim 7, wherein:
   in the fiber conveying step, absorbent particles are added to the fibers in the duct, and the fibers and the particles are conveyed by the air flow flowing in the duct; and
   in the fiber stacking step, the particles and the fibers are accumulated on the outer peripheral face of the first drum.

9. The method for manufacturing an absorbent body according to claim 4, wherein:
   in the fiber conveying step, absorbent particles are added to the fibers in the duct, and the fibers and the particles are conveyed by the air flow flowing in the duct; and
   in the fiber stacking step, the particles and the fibers are accumulated on the outer peripheral face of the first drum.

* * * * *